United States Patent
Johansson et al.

(10) Patent No.: US 10,247,124 B2
(45) Date of Patent: Apr. 2, 2019

(54) METHOD AND SYSTEM FOR DETECTION OF TORQUE DEVIATIONS OF AN ENGINE IN A VEHICLE

(71) Applicant: Scania CV AB, Södertälje (SE)

(72) Inventors: Björn Johansson, Älvsjö (SE); Carl Svärd, Bromma (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 15/580,316

(22) PCT Filed: May 26, 2016

(86) PCT No.: PCT/SE2016/050487
§ 371 (c)(1),
(2) Date: Dec. 7, 2017

(87) PCT Pub. No.: WO2016/204672
PCT Pub. Date: Dec. 22, 2016

(65) Prior Publication Data
US 2018/0171918 A1 Jun. 21, 2018

(30) Foreign Application Priority Data
Jun. 15, 2015 (SE) .................................... 1550812

(51) Int. Cl.
*F02D 41/26* (2006.01)
*F02D 41/14* (2006.01)
(Continued)

(52) U.S. Cl.
CPC .......... *F02D 41/1497* (2013.01); *B60K 28/16* (2013.01); *B60W 10/06* (2013.01);
(Continued)

(58) Field of Classification Search
CPC ................ F02D 41/1497; F02D 41/22; F02D 2041/224; F02D 2041/286; F02D 2200/1004; G01M 15/042
(Continued)

(56) References Cited

U.S. PATENT DOCUMENTS

| | | | |
|---|---|---|---|
| 5,774,821 A | 6/1998 | Eckert | 701/78 |
| 7,530,344 B2 * | 5/2009 | Weiss | F02D 31/003 123/339.19 |

(Continued)

FOREIGN PATENT DOCUMENTS

| | | |
|---|---|---|
| DE | 10 2010 019 301 A1 | 11/2010 |
| DE | 10 2012 112 627 A1 | 6/2013 |

(Continued)

OTHER PUBLICATIONS

International Search Report dated Jul. 26, 2016 in corresponding PCT International Application No. PCT/SE2016/050487.
(Continued)

*Primary Examiner* — Hai H Huynh
(74) *Attorney, Agent, or Firm* — Ostrolenk Faber LLP

(57) ABSTRACT

A method and a system for detection of torque deviations of an engine (101) in a vehicle (100). A measurement (201) is made of actual measured values $D_{act}$ related to a behavior of at least one parameter which is related to an actual torque $M_{eng\_act}$ delivered by the engine (101). This actual torque $M_{eng\_act}$ is delivered here by the engine (101) in consequence of a torque $M_{eng\_req}$ demanded from the engine (101). A comparison (202) is then made of the actual measured values $D_{act}$ which are related to the behavior of the at least one parameter with previously determined measured values $D_{ref}$ of correspondingly at least one respective parameter related to the actual torque $M_{eng\_act}$. The previously determined measured values $D_{ref}$ will here have been deter-
(Continued)

mined during normal operation of the vehicle (100). Detection is then made of whether the actual measured actual torque $M_{eng\_act}$ deviates from the demanded torque $M_{engj-eq}$. The detection is based here on the comparison of the actual measured values $D_{act}$ with the previously determined measured values $D_{ref}$.

22 Claims, 6 Drawing Sheets

(51) Int. Cl.
    *B60K 28/16*      (2006.01)
    *B60W 10/06*      (2006.01)
    *F02D 41/22*      (2006.01)
    *G01M 15/04*      (2006.01)
    *F02D 41/28*      (2006.01)

(52) U.S. Cl.
    CPC ......... *F02D 41/22* (2013.01); *G01M 15/042* (2013.01); *F02D 2041/224* (2013.01); *F02D 2041/286* (2013.01); *F02D 2200/1002* (2013.01); *F02D 2200/1004* (2013.01)

(58) Field of Classification Search
    USPC .................. 123/436; 701/110; 73/114.11
    See application file for complete search history.

(56) References Cited

U.S. PATENT DOCUMENTS

| | | | |
|---|---|---|---|
| 9,644,566 B2* | 5/2017 | Girotto | ............... F02D 41/247 |
| 2004/0089267 A1 | 5/2004 | Doering | ................. 123/406.23 |
| 2004/0099454 A1 | 5/2004 | Hughes | ...................... 180/65.2 |
| 2006/0260853 A1* | 11/2006 | Ando | .................... F02D 29/06 |
| | | | 180/65.22 |
| 2012/0310505 A1 | 12/2012 | Morgan | ....................... 701/102 |

FOREIGN PATENT DOCUMENTS

| | | |
|---|---|---|
| EP | 0 811 758 A2 | 12/1997 |
| EP | 1 972 769 A2 | 9/2008 |
| KR | 10-2014-0002523 A | 1/2014 |
| WO | WO 2014/200421 A1 | 12/2014 |

OTHER PUBLICATIONS

Written Opinion dated Jul. 26, 2016 in corresponding PCT International Application No. PCT/SE2016/050487.

Korean Office Action, dated Jan. 16, 2019, issued in corresponding Korean Patent Application No. 10-2018-7000327. Includes English translation. Total 20 pages.

European Search Report, dated Jan. 22, 2019, issued in corresponding European Patent Application No. 16812041.8. Total 5 pages.

* cited by examiner

METHOD AND SYSTEM FOR DETECTION OF TORQUE DEVIATIONS OF AN ENGINE IN A VEHICLE

CROSS-REFERENCE TO RELATED APPLICATIONS

The present application is a 35 U.S.C. §§ 371 national phase conversion of PCT/SE2016/050487, filed May 26, 2016, which claims priority of Swedish Patent Application No. 1550812-0, filed Jun. 15, 2015, the contents of which are incorporated by reference herein. The PCT International Application was published in the English language.

TECHNICAL FIELD

The present invention relates to a method for detection of torque deviations of an engine. The present invention relates also to a system configured for detection of torque deviations of an engine, a computer program and a computer program product which implement the method according to the invention, and a vehicle provided with a system according to the present invention.

BACKGROUND OF THE INVENTION

The background description set out below represents a description of the background to the present invention and therefore does not necessarily constitute prior art.

Combustion engines, e.g. those of vehicles or watercraft, are powered by fuels such as diesel, petrol, ethanol or mixtures of such fuels with one another and/or with additives of various kinds. The fuel is provided to the combustion engine by a fuel system comprising inter alia one or more fuel tanks and devices which convey the fuel from the fuel tanks to the combustion engine.

The devices which convey the fuel to the engine may for example comprise lines for transferring the fuel within the vehicle, one or more pumps, which may be divided into respective low-pressure and high-pressure circuits, filters, connections and other devices for fuel transfer. The fuel is injected into the engine's cylinders by a fuel injection system which comprises one injection means, also called injector, per cylinder. The injection means may for example be provided with fuel by a common-rail unit which provides pressurized fuel to all of the injection means, or by separate units with pressurized fuel for the respective injection means.

In the engine's cylinders the fuel is burnt, thereby creating a torque which is provided by the engine via its output shaft.

It is important for many systems in, for example, a vehicle that an engine of the vehicle be provided with an expected/demanded torque. The expected/demanded torque usually corresponds here to a torque demanded from the engine. There is for example a risk that automatically effected gearchanges in a gearbox may take place in a non-optimum way if the torque provided by the engine differs from the torque which the gearchange system expects the engine to provide. Systems for cruise control of the vehicle will base their control of the engine on an expected torque provided, which means that the cruise control also risks becoming non-optimum if an unexpected torque is provided by the engine. A non-optimum cruise control most often results also in unnecessarily high fuel consumption and hence also in unnecessarily high discharges of exhaust gases from the vehicle.

There may be various reasons why the torque provided by the engine does not correspond to the torque expected to be delivered by the engine.

One reason for an unexpected torque being delivered may be that a fuel with an energy content which differs from an expected energy content is used to power the engine. For example, a fuel with a lower energy content, e.g. some kind of bio-diesel, may be used in the vehicle despite the vehicle's systems being set such that a fuel with a higher energy content, e.g. fossil diesel, is being used. If, for example, FAME (fatty acid methyl ester) is used to power the engine when the systems is set for fossil diesel being used, the power output and the torque provided by the engine will likely decrease, in some cases by up to about 10 percent.

Another reason for an unexpected torque being delivered may be that no fuel is being injected into the cylinders because of a fuel stoppage in the fuel system. Fuel stoppages may occur for various reasons in various ways. Faults and/or damage may for example occur in the fuel tanks, in the devices which convey the fuel from the fuel tanks to the engine and/or in the fuel injection system. When there is a stoppage in the fuel supply to the engine, the engine will provide no propulsive torque. There is therefore an obvious risk that engine stoppage may for example occur during a gearchange if the gearchange system thinks that a certain torque is provided by the engine when the actual torque provided is nil.

BRIEF DESCRIPTION OF THE INVENTION

It is therefore an object of the present invention to propose a method and a system for detection of torque deviations of an engine which at least partly solve the abovementioned problems.

According to the present invention, torque deviations are detected with respect to an engine in a vehicle. A measurement is first made of actual measured values $D_{act}$ related to a behavior of at least one parameter which is related to an actual torque $M_{eng\_act}$ delivered by the engine. This actual torque $M_{eng\_act}$ is here delivered by the engine in consequence of a torque $M_{end\_req}$ being demanded from the engine.

The actual measured values $D_{act}$ which are related to the behavior of the at least one parameter are then compared with previously determined measured values $D_{ref}$ of correspondingly at least one respective parameter related to the actual torque $M_{eng\_act}$. These previously determined measured values $D_{ref}$ will have been determined during normal operation of the vehicle, which will also have made it possible to determine a relationship between the torque $M_{eng\_req}$ demanded from the engine and the previously determined measured values $D_{ref}$.

This is followed by detection of whether the actual measured torque $M_{eng\_act}$ deviates from the demanded torque $M_{eng\_req}$. This detection is based on comparing the actual measured values $D_{act}$ with the previously determined measured values $D_{ref}$. If a torque deviation is thus detected, the reason for it can be isolated, as described in more detail below.

The detection of any deviating value of the actual measured torque $M_{eng\_act}$ may in one embodiment of the present invention be used in controlling at least one of the vehicle's systems, e.g. a system arranged for automatic gearchanging by the gearbox, or a cruise control system of the vehicle.

Applying the present invention will considerably reduce the risk of incorrect assumptions about engine torque provided. This means for example that the control of gearchanges in a gearbox, or of vehicle speeds, can be made very exact and reliable, resulting inter alia in lower fuel consumption and/or improved comfort on board the vehicle. The engine system and/or the fuel injection system may also correct the fuel injections to achieve the desired engine torque if correct assumptions about torque provided can reliably be made.

There will also be less risk that a fuel supply stoppage might go unnoticed. Applying the present invention will make it possible to reliably detect fuel supply stoppages, which means that gearchanges which might lead to engine stoppage can be avoided.

Being able to avoid engine stoppage also improves safety for the vehicle and its driver in that loss of steering servo action owing to engine stoppage can thereby be avoided.

The previously determined measured values used by the method according to the present invention may be determined during normal operation of the vehicle, which means that these measured values will substantially always be available for use by the method.

The present invention may be implemented in the vehicle's software, thus adding very little to the vehicle's complexity.

BRIEF DESCRIPTION OF DRAWINGS

The invention is explained in more detail below with reference to the attached drawings, in which the same reference notations are used for similar items, and FIG. 1 schematically depicts an example of a vehicle in which the present invention may be implemented, FIGS. 3A-B depict schematic examples of torque/engine speed for an engine, wherein FIG. 3A depicts an engine to which fuel is then being delivered, and FIG. 3B depicts an engine to which fuel is not then being delivered.

DESCRIPTION OF PREFERRED EMBODIMENTS

This specification exemplifies and describes the present invention principally for a vehicle, but one skilled in the art will appreciate that the invention may be implemented and used in substantially all units which have an engine system, e.g. in watercraft or aircraft.

Figure 1:
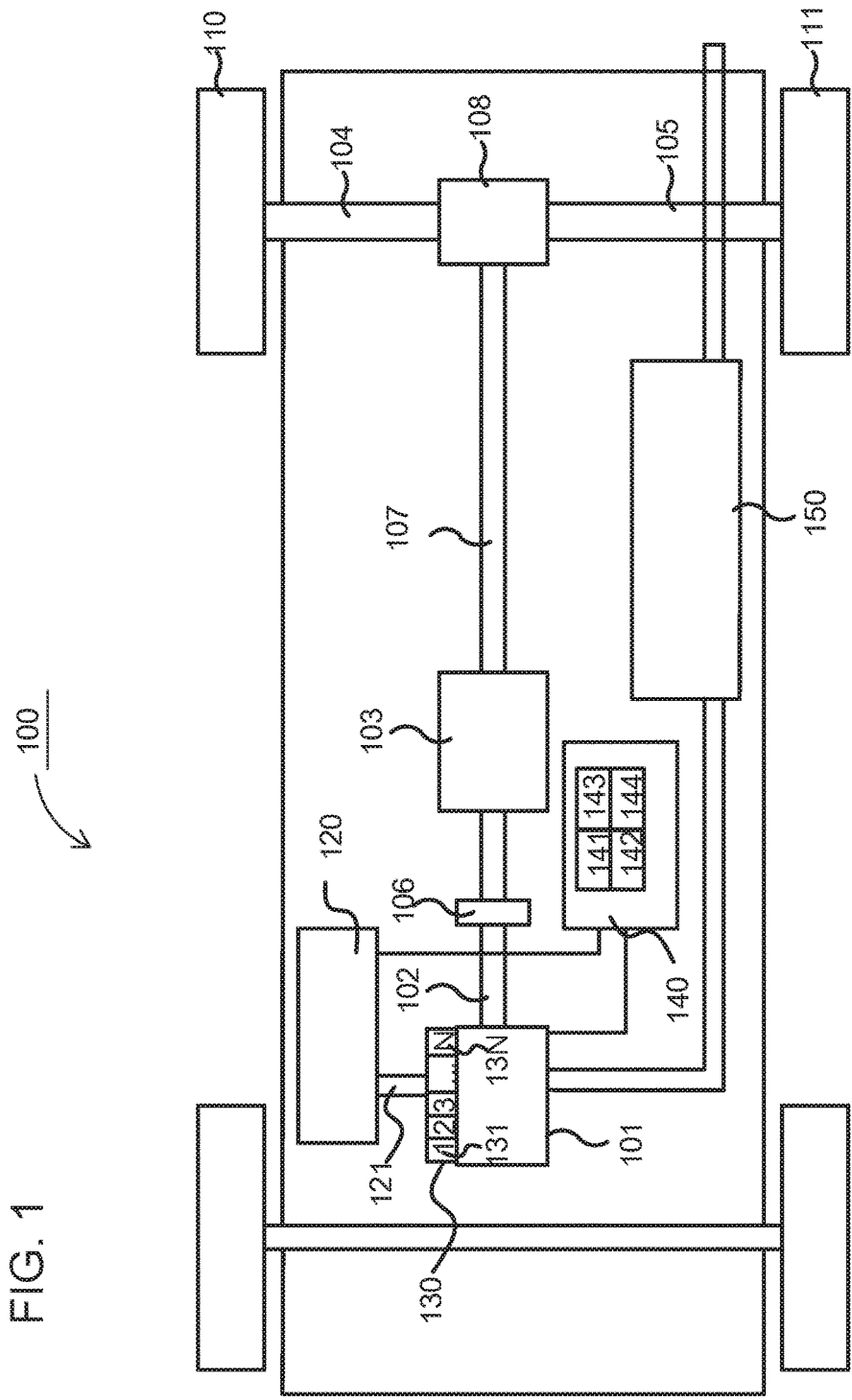

FIG. 1 depicts schematically an example of a vehicle 100 which may be provided with the present invention. The vehicle, which may be a car, a truck, a bus or some other vehicle, has a powertrain which conveys power to the vehicle's tractive wheels 110, 111. The powertrain comprises a combustion engine 101 which in a conventional way, via an output shaft 102 from the engine, is connected to a gearbox 103 via a clutch 106. The powertrain may of course also be of some other type, e.g. a type with conventional automatic gearbox, a type with hybrid powertrain, etc.

The engine 101 is powered by fuel which is provided by a fuel system 120 comprising inter alia one or more fuel tanks, devices 121 which transfer the fuel from the fuel tanks to the engine 101, and a fuel injection system 130 which is arranged to inject fuel into the engine's cylinders with a number N of injection means 131 . . . 13N, where N may for example be the numeral 5, 8, 12 or some other suitable numeral for the number of cylinders of the engine 101. The devices for fuel transfer 121 are here depicted very schematically but may for example comprise one or more lines for transferring fuel within the vehicle, one or more pumps, which may be divided into respective low-pressure and high-pressure circuits, filters, connections and other devices for fuel transfer. The combustion engine 101 is controlled by the vehicle's control system via a control unit 140 which is illustrated schematically in FIG. 1. The fuel system 120 is controlled by the vehicle's control system via a control unit 140 which in FIG. 1 is schematically illustrated as the same control unit as controls the engine 101 but which may also be arranged separately from this control unit 140.

The control unit 140 according to the present invention comprises also a measuring unit 141, a comparison unit 142 and a detection unit 143 and, in one embodiment, a utilization unit 144. The control unit 140 may be connected to at least the engine 101, to the fuel system 120 and to other systems which base their decisions on the engine torque, and an automatic gearchange system and/or a cruise control system (not depicted in FIG. 1). The measuring unit 141, the comparison unit 142, the detection unit 143 and the utilization unit 144 are described in more detail below. The measuring unit 141, the comparison unit 142, the detection unit 143 and the utilization unit 144 are illustrated in FIG. 1 as individual units, but their functions may also be implemented in fewer units, e.g. in one unit, as one skilled in the art will appreciate. The control unit 140 may be part of, or cooperate with, an EMS (engine management system) circuit of the vehicle.

An output shaft 107 from the gearbox 103 drives the tractive wheels 110, 111 via a final gear 108, e.g. a conventional differential, and driveshafts 104, 105 which are connected to the final gear.

Exhaust gases created by the engine 101 during its combustion of the fuel are cleaned by an exhaust treatment system 150 before being discharged from the vehicle.

Figure 2:
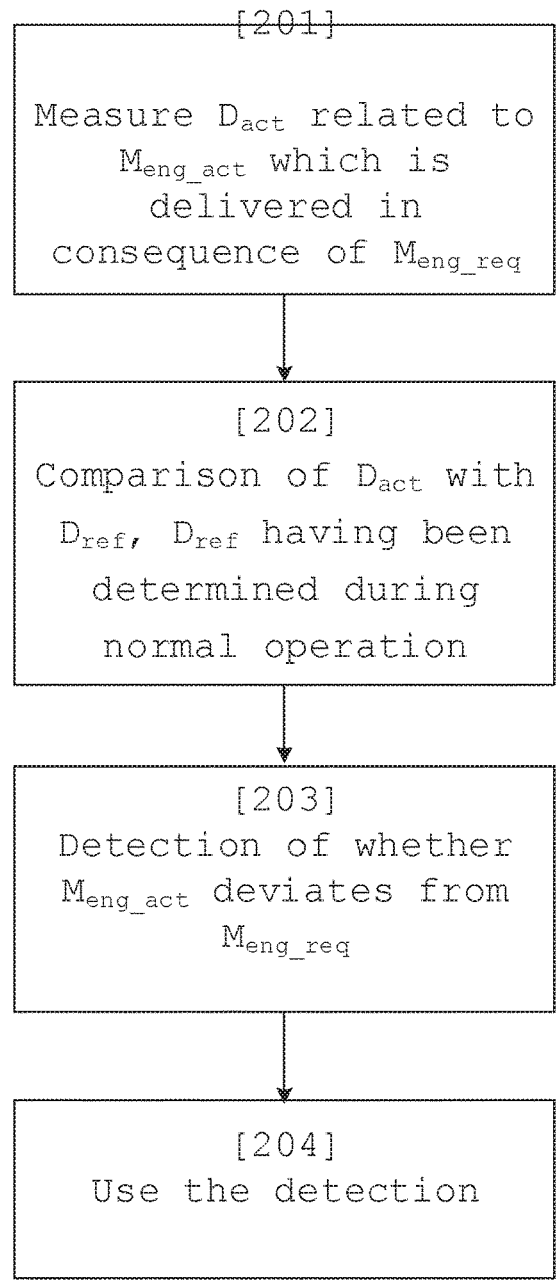
FIG. 2 depicts a flowchart for the method according to an embodiment of the present invention.

FIG. 2 depicts a flowchart for a method according to the present invention, representing a detection of torque deviations of an engine of a vehicle. As described above, the torque delivered by the vehicle's engine 101 should vary with respect to a value for the torque which the engine should deliver at a point in time. The present invention may be employed to make it possible to deal with such unpredictable variations in the torque provided.

A first step 201 of the method according to the present invention is to make a measurement of actual values $D_{act}$ related to a behavior of at least one parameter which is related to an actual torque $M_{eng\_act}$ delivered by the engine 101. This actual torque $M_{eng\_act}$ is here delivered in consequence of a torque $M_{eng\_req}$ demanded from the engine.

As a second step 202 of the method according to the present invention, the actual measured values $D_{act}$ related to the behavior of at least one parameter are compared with previously determined measured values $D_{ref}$ of correspondingly at least one respective parameter related to the actual torque $M_{eng\_act}$. These previously determined measured values $D_{ref}$ will have been determined during normal operation of the vehicle 100.

A third step 203 of the method according to the present invention is to detect whether the actual measured torque $M_{eng\_act}$ deviates from the demanded torque $M_{eng\_req}$. This detection is based on the comparison in the second step 202.

As a fourth step 204, in one embodiment of the present invention, the detection in the third step 203 is used in controlling at least one system of the vehicle 100, e.g. a system arranged for automatic gearchanging by the gearbox 103, or a system arranged for cruise control of the vehicle's speed.

Applying the present invention makes it possible for considerably more correct assumptions to be made about an engine torque provided. These more correct assumptions may be used to achieve exact and reliable control of, for example, gearchanges in a gearbox and/or of the vehicle's speeds When the present invention is employed, stoppages in the fuel supply may also be reliably detected, making it possible to avoid gearchanges which might lead to engine stoppage. The present invention provides assurance that correct assumptions about torque provided can be made, which means that these correct assumptions may be used by the engine system and/or the fuel injection system to correct the fuel injections in order to achieve a desired engine torque.

The present invention may be implemented in software, e.g in the control unit 140, thus adding very little to the vehicle's complexity and/or manufacturing cost.

As described above, the present invention compares the actual measured values $D_{act}$ with corresponding previously determined measured values $D_{ref}$ which will have been determined during normal operation of the vehicle 100. The vehicle's normal operation may comprise being in motion when fuel is injected into the engine 101 in order to power the engine and hence the vehicle. The fuel is here injected into the engine in response to engine torque demand from the driver, e.g. via an accelerator pedal, or from a system, e.g. a cruise control system.

The vehicle's normal operation may also comprise being in motion when the fuel injection to the engine is intentionally halted, i.e. during dragging of the vehicle. If the vehicle has sufficient kinetic energy when the fuel injection to the engine is intentionally halted, this kinetic energy will be able to move the vehicle by the engine being turned. When the engine is turned by the vehicle's kinetic energy, friction between the engine's movable and/or fixed parts will create a braking force, resulting in so-called engine braking. Dragging/engine braking of the vehicle is often employed on downhill runs and/or when the vehicle's speed needs reducing.

The previously determined measured values $D_{ref}$ correspond, as described above, to the at least one respective parameter related to the actual measured torque $M_{eng\_act}$. The previously determined measured values $D_{ref}$ may in one embodiment have been determined when the vehicle was substantially new, e.g. on a test rig substantially immediately after the vehicle's manufacture. The previously determined measured values $D_{ref}$ will thereafter be stored in a suitable way on board the vehicle to enable them to be subsequently retrieved and used in the vehicle in comparisons with the actual measured values $D_{act}$. Thus in that embodiment the previously determined and stored measured values $D_{ref}$ will remain unchanged in the vehicle. This means that both slow and rapid patterns of deviation can be reliably detected.

The previously determined measured values $D_{ref}$ may also, in one embodiment, be determined by at least partly continuous updating of previously determined measured values $D_{ref}$ when the vehicle is being used. Thus the previously determined measured values $D_{ref}$ will here be stored in a suitable way on board the vehicle, after which the saved values are updated and rewritten when the vehicle is being used. These saved values will thus always be current and updated values which may be used in the vehicle in comparisons with the actual measured values $D_{act}$. In this embodiment the measured values $D_{ref}$ previously determined and stored on board the vehicle may be changed over time if the recurrent measurements indicate that the values need changing. This means that rapid patterns of deviation can be detected with great reliability.

As described above, the present invention compares actual measured values $D_{act}$ and previously determined measured values $D_{ref}$ related to a behavior of at least one parameter which is related to an actual torque $M_{eng\_act}$ delivered by the engine 101.

This at least one parameter may in one embodiment comprise a speed $\omega$ of the vehicle's engine 101, in which case comparisons of actual engine speeds $\omega_{act}$ with previously determined engine speeds $\omega_{ref}$ will be made.

The previously determined measured values $D_{ref}$ will then have been determined at loads $N_{ref}$ and engine speeds $\omega_{ref}$ during normal operation of the engine 101 and/or the vehicle 100. Such previously determined measured values $D_{ref}$ may for example resemble the schematic curves in FIGS. 3A and 3B, which will have been measured during normal operation of the vehicle and/or the engine.

Figure 3A:
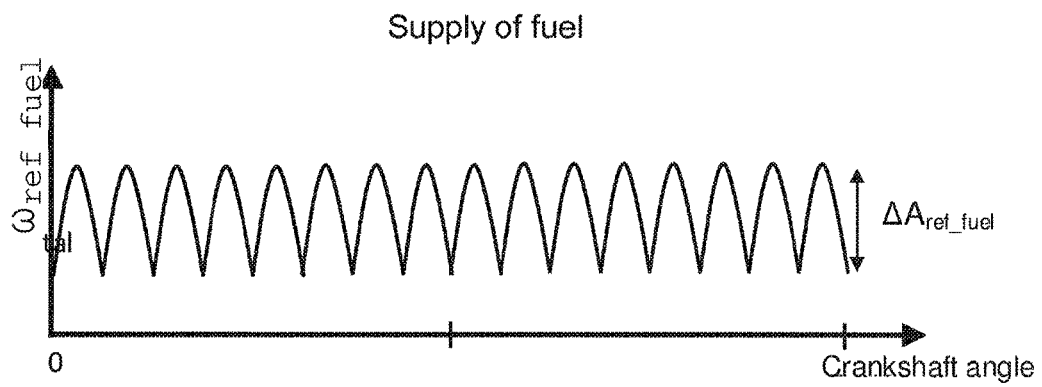
Figure 3B:
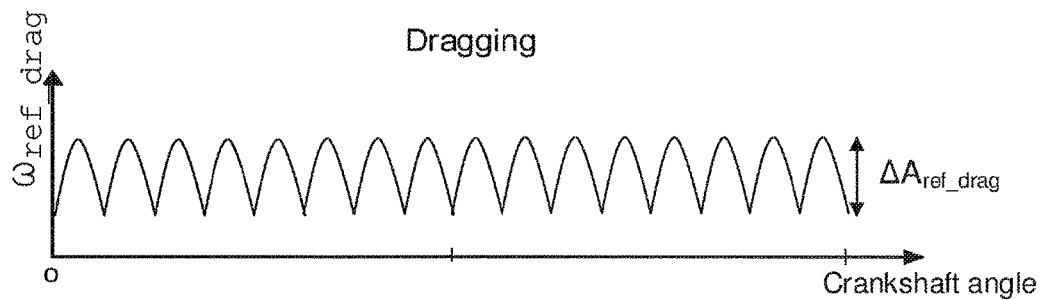

FIGS. 3A and 3B show schematically variation of the engine crankshaft rotation speed with respect to the crankshaft rotation position. The y-axis shows rotation speed of the crankshaft and the x-axis shows its rotational position and does not show time, although that position varies over time.

The amplitude of the curves depends on the amount of injected fuel. More injected fuel produces more torque and increased amplitude for all cylinders. FIG. 3A shows engine RPM when fuel is injected. FIG. 3B shows engine RPM when no fuel is injected and no torque is generated. In the latter case, the engine is only breathing or pumping air.

In FIG. 3A the previously determined measured values $D_{ref}$ were measured when fuel was being used to move the vehicle. $\Delta A_{ref\_fuel}$ thus illustrates the variation in amplitude of the previously determined measured values $D_{ref}$ when fuel is injected into the engine's cylinders to power the engine. In FIG. 3B the previously determined measured values $D_{ref}$ were measured when no fuel was being used to move the vehicle, i.e. during so-called dragging of the vehicle, a situation in which the vehicle is moved by its kinetic energy without fuel being injected into the engine. $\Delta A_{ref\_drag}$ thus illustrates the variation in amplitude of the previously determined measured values $D_{ref}$ when dragging takes place during normal use of the vehicle.

Measuring the behavior of the at least one parameter comprises here a measurement of an actual amplitude variation $\Delta A_{act}$ of the actual speed $\omega_{act}$ of the engine 101. This actual amplitude variation $\Delta A_{act}$ of the actual engine speed $\omega_{act}$ is then compared with previously determined measured values $D_{ref}$ of the engine speed $\omega_{ref}$, e.g. with the amplitude variations $\Delta A_{ref\_fuel}$, $\Delta A_{ref\_drag}$ of the previously determined measured values $D_{ref}$.

For example, a stoppage of fuel supply to the engine 101 may be detected on the basis of such a comparison of the actual amplitude variation $\Delta A_{act}$ and the previously determined measured values $D_{ref}$ of the engine speed $\omega_{ref}$. A comparison between the amplitude variations $\Delta A_{ref\_fuel}$, $\Delta A_{ref\_drag}$ of the previously determined measured values $D_{ref}$ and the actual amplitude variation $\Delta A_{act}$ of the actual engine speed $\omega_{act}$ may thus for example indicate that no, or only a very limited amount of, fuel is reaching the engine 101. This detection is based on the relationship that the actual amplitude variation $\Delta A_{act}$ should increase with increasing actual load $N_{act}$ if there is fuel supply to the engine. This also means that if there is a constant or increasing actual load $N_{act}$ on the engine but the actual amplitude variation $\Delta A_{act}$ decreases, this may be interpreted as indicating insufficient fuel reaching the engine.

As depicted in FIGS. 3A and 3B, the amplitude variations of the speed $\omega_{ref}$ of the engine 101 during normal operation are greater when fuel is being injected into the engine than during dragging, i.e. $\Delta A_{ref\_fuel} > \Delta A_{ref\_drag}$. The magnitude of the actual amplitude variation $\Delta A_{act}$ is generally substantially proportional to the actually generated torque provided by the engine.

Comparing the actual amplitude variation $\Delta A_{act}$ and the previously determined measured values $D_{ref}$ of the engine speed $\omega_{ref}$, i.e. comparing the actual amplitude variation $\Delta A_{act}$ with the amplitude variations during fuel injection $\Delta A_{ref\_fuel}$ and during dragging $\Delta A_{ref\_drag}$ may therefore for example show that there is fuel supply stoppage if the actual amplitude variation $\Delta A_{act}$ is substantially equal to the amplitude variations during dragging $\Delta A_{ref\_drag}$. This is because no fuel was being injected into the engine when the previously determined measured values $D_{ref}$ of the engine speed $D_{ref}$ were determined during dragging of the vehicle, so the amplitude variations during dragging $\Delta A_{ref\_drag}$ will be similar to the amplitude variations which may occur if there is fuel supply stoppage. As this embodiment of the present invention also determines measured values $D_{ref}$ of both loads $N_{ref}$ and engine speeds $\omega_{ref}$ during normal operation of the vehicle, the amplitude variations during dragging $\Delta A_{ref\_drag}$ can easily be identified in the determined measured values $D_{ref}$.

As mentioned above, the previously determined measured values $D_{ref}$ at loads $N_{ref}$ and engine speeds $\omega_{ref}$ may be determined during normal operation of the vehicle. As the vehicle will often be moved by the injection of fuel into the engine during normal operation, the curve in FIG. 3A may almost always be achieved when the vehicle is in motion. Dragging/engine braking of the vehicle also takes place during normal operation of the vehicle, e.g. on downhill runs and/or if the vehicle's speed needs reducing. Therefore the curve in FIG. 3B is also achievable during normal operation of the vehicle. This means that no special measures are required for initiating the system according to the present invention. No extra measures beyond normal operation will of course be required for previous determination of measured values $D_{ref}$ of the engine speed $\omega_{ref}$, which of course also leads to determination of amplitude variations during fuel injection $\Delta A_{ref\_fuel}$ and during dragging $\Delta A_{ref\_drag}$ which the actual amplitude variations $\Delta A_{act}$ can be compared with.

The examples of engine speed curves schematically illustrated in FIGS. 3A and 3B may also have other configurations and other amplitudes, and may depend on other parameters. All such different configurations of the curves may according to the present invention be used for detecting engine fuel supply stoppage.

For example, previously determined measured values $D_{ref}$ of the engine speed $\omega_{ref}$ and the load $N_{ref}$ may also be determined for different types of fuel, in which case curves corresponding to those depicted in FIGS. 3A and 3B may be arrived at for the respective fuels. Here it is thus also possible to arrive at a respective curve per fuel type, which may obviously be more than two in number. There is a relationship that the actual amplitude variation $\Delta A_{act}$ is proportional to the actual energy content $E_{act}$ of a fuel used. For example, a curve with relatively large amplitude variation $\Delta A_{ref\_fuel\ no\ 1}$ resembling the curve in FIG. 3A would represent a fuel with a relatively large energy content, e.g. fossil diesel, whereas a curve with relatively small amplitude variation $\Delta A_{ref\_fuel\ no\ 2}$ resembling the curve in FIG. 3B may represent a fuel with a relatively small energy content, e.g. FAME or some other bio-diesel.

This may in one embodiment of the present invention be utilized to detect a fuel type actually being used. The use of alternative fuels is very attractive in that certain alternative fuels may reduce carbon dioxide emissions. But there is a need for reliable methods for detecting which type of fuel is currently present in the tank, i.e. which fuel type is currently being injected into the engine to move the vehicle.

If the fuel type actually used has an actual energy content $E_{act}$ which deviates from an expected energy content $E_{exp}$ of an expected fuel type used, e.g. if the actual amplitude variation $\Delta A_{act}$ is substantially similar to the curve which has a relatively small amplitude variation $\Delta A_{ref\_fuel\ no\ 2}$ in FIG. 3B despite expecting a curve with relatively large amplitude variation $\Delta A_{ref\_fuel\ no\ 1}$ in FIG. 3A, this may be an indication that the fuel actually being used is something other than the type expected.

In other words, the actual amplitude variation $\Delta A_{act}$ is compared with the amplitude variations $\Delta A_{ref\_fuel\ no\ 1}$, $\Delta A_{ref\_fuel\ no\ 2}$ for the various fuel types which are based on the previously determined measured values $D_{ref}$ of the engine speed $\omega_{ref}$, making it possible to detect the fuel type now actually being injected into the engine to power it. Thus the fuel type corresponding to the amplitude variation $\Delta A_{ref\_fuel\ no\ 1}$, $\Delta A_{ref\_fuel\ no\ 2}$ which is based on the previously determined measured values $D_{ref}$ and which most closely resembles the actual amplitude variation $\Delta A_{act}$ may be detected as the fuel type actually being used.

As described above, the present invention compares actual measured values $D_{act}$ and previously determined measured values $D_{ref}$ related to a behavior of at least one parameter which is related to an actual torque $M_{eng\_act}$ delivered by the engine 101.

In one embodiment this at least one parameter may comprise a charge pressure $P_{air}$ of air supplied to the engine.

In this case, previously determined measured values $D_{ref}$ will have been determined at loads $N_{ref}$ and charge pressures $P_{air\_ref}$ of air supplied to the engine 101 during normal operation of the vehicle 100, i.e. when the vehicle was being driven in a normal way.

An actual charge pressure $P_{air\_act}$ for the engine, i.e. the charge pressure $P_{air\_act}$ actually supplied to the engine, is measured and this measurement thus represents a measurement of the behavior of the at least one parameter of charge pressure $P_{air}$. The measured actual charge pressure $P_{air\_act}$ and the previously determined measured values $D_{ref}$ of the charge pressure $P_{air\_ref}$ are then compared.

As the actual charge pressure $P_{air\_act}$ should increase with increasing actual load $N_{act}$, the comparison of the measured actual charge pressure $P_{air\_act}$ and the previously determined measured values $D_{ref}$ of the charge pressure $P_{air\_ref}$ may be used to detect whether the actual torque $M_{eng\_act}$ deviates from the demanded torque $M_{eng}$.

As described above, the present invention compares actual measured values $D_{act}$ and previously determined measured values $D_{ref}$ related to a behavior of at least one parameter which is related to an actual torque $M_{eng\_act}$ delivered by the engine 101.

In one embodiment this at least one parameter may comprise a temperature $T_{eng}$ of the engine 101, e.g. a motor oil temperature, a cooling water temperature and/or an exhaust temperature.

The previously determined measured values $D_{ref}$ will have here been determined at loads $N_{ref}$ and temperatures $T_{eng\_ref}$ of the engine 101 during normal operation of the vehicle 100. The measurement of the behavior of the at least one parameter of engine temperature $T_{eng}$ comprises here a measurement of an actual temperature $T_{eng\_act}$ of the engine.

The actual engine temperature $T_{eng\_act}$ and the previously determined measured values $D_{ref}$ of the engine temperature $T_{eng\_ref}$ are then compared, making it possible to detect whether the actual torque $M_{eng\_act}$ deviates from the demanded torque $M_{eng}$. The detection uses here the relationship that the actual engine temperature $T_{eng\_act}$ should increase with increasing actual load $N_{act}$.

In one embodiment of the present invention the previously determined measured values $D_{ref}$ are correlated statistically. The statistical collation may comprise an average value $\mu$ for one or more measured values $D_{ref}$, $D_{act}$ of the at least one respective parameter related to the actual torque $M_{eng\_act}$. The statistical correlation may also comprise a standard deviation $\sigma$ of the one or more measured values $D_{ref}$, $D_{act}$. The statistical correlation may also comprise both the average value $\mu$ and the standard deviation $\sigma$ of said one or more measured values $D_{ref}$, $D_{act}$.

The previously determined measured values $D_{ref}$ may be divided into intervals 0, 1, 2, ..., m for a load $N_{ref}$ of the engine 101 and may be stored in a chart/matrix which is divided into these load intervals 0, 1, 2, ..., m. The previously determined measured values $D_{ref}$ may also be divided into intervals a, b, c, ... n for the engine speed $\omega_{ref}$, for the charge pressure $P_{air\_ref}$ or for the engine temperature $T_{eng\_ref}$ and may be stored in a chart/matrix which is divided into these intervals a, b, c, ... n. FIG. 4B illustrates schematically an example of such a chart/matrix according to one embodiment, in which the load range and engine speed range are divided into m*n sections corresponding to the respective intervals a, b, c, ... n for the engine speed $\omega_{ref}$ and 0, 1, 2, ..., m for the load $N_{ref}$.

Load is often defined as a proportion, e.g. a percentage, of a maximum torque at a current engine speed, which may for example be arrived at from a torque and power output curve for the respective engine. When the aforesaid load intervals 0, 1, 2, ..., m are used in the chart, they may be of the same extent even if the maximum torque changes with the engine speed.

One skilled in the art will appreciate that the chart in FIG. 4B might also have torque on the y axis, in which case the chart would have torque intervals 0, 1, 2, ..., m. The extent of these torque intervals would then change if the maximum torque changes with the engine speed. This specification principally describes charts of load intervals 0, 1, 2, ..., m, but the present invention is not limited to using just these load intervals.

Corresponding matrices/files comprising intervals a, b, c, ... n for the charge pressure $P_{air\_ref}$ or for the engine temperature $T_{eng\_ref}$ may be arrived at in a similar way to loads. An embodiment of the invention described below uses a matrix/file with m*n sections corresponding to the respective intervals a, b, c, ... n for the engine speed $\omega_{ref}$ and 0, 1, 2, ..., m for the load $N_{ref}$.

In one embodiment of the present invention the bottom row in the chart, i.e. sections a0, b0, c0, ... n0, corresponds to dragging of the vehicle, since the load is substantially nil for these sections. The chart may thus be used in detection of fuel supply stoppage.

Each section of the chart is correlated in signal statistics, which means that measurements are made and stored as previously determined measured values $D_{ref}$ for the respective section, for the estimated engine torque generated during normal operation of the vehicle, as described above.

Measurements of the actual values $D_{act}$ related to the behavior of the at least one parameter which is related to the actual torque $M_{eng\_act}$ are then made. These actual values $D_{act}$ have then to be compared with the previously determined measured values $D_{ref}$. In one embodiment this may be done by using the values in the sections in FIG. 4b.

The comparison between $D_{act}$ and $D_{ref}$ may be done in two steps. The first step detects whether the expected/demanded torque $M_{eng\_req}$ corresponds to the actual torque $M_{eng\_act}$. The second step isolates the reason why the actual torque $M_{eng\_act}$ does not correspond to the expected/demanded torque. If the result of step 1 is that the demanded torque $M_{eng\_req}$ and actual torque $M_{eng\_act}$ correspond, step 2 need not be performed.

If an actual current load $N_{act}$ at an actual engine speed $\omega_{act}$ should for example correspond to the previously determined and stored measured values $D_{ref}$ for section c2 in the chart, since the demanded engine torque $M_{eng\_req}$ corresponds to section c2, but the actual current load $N_{act}$ corresponds instead to the previously determined and stored measured values $D_{ref}$ for section c0, a fuel supply stoppage may be detected and isolated. This is because measurement data in section c0 were gathered during dragging of the vehicle and no fuel is injected into the engine during dragging.

If the actual current load $N_{act}$ at an actual engine speed $\omega_{act}$ should correspond to the previously determined and stored measured values $D_{ref}$ for section c2 in the chart, where section c2 represents a second fuel br2 which the system thinks is being used in the vehicle, but instead corresponds for example to the previously determined and stored measured values $D_{ref}$ for section c1, a change of fuel type to a first type br1 may be detected. This detection may be made if measurement data in section c1 were gathered during operation of the vehicle with the first fuel type br1, whereas measurement data in section c2 were gathered during operation of the vehicle with the second fuel br2.

As described above, the present invention compares the actual measured values $D_{act}$ with previously determined measured values $D_{ref}$ of at least one respective parameter related to the actual torque $M_{eng\_act}$.

These comparisons may for example comprise using a null hypothesis analysis when the previously determined measured values $D_{ref}$ are correlated statistically, as described in more detail below. The comparisons may be made in two steps. The aim in step 1 is to detect whether the actual torque $M_{eng\_act}$ deviates from the expected torque $M_{eng\_req}$ demanded. In this case the null hypothesis is that the torques are of equal magnitude and the alternative hypothesis that they are not. Step 2 isolates the reason why the actual torque $M_{eng\_act}$ does not correspond to the demanded torque $M_{eng\_req}$. This isolating step may be performed with a number of different parallel hypothesis tests in which the null hypothesis in each test is represented by the actual torque $M_{eng\_act}$ corresponding to the demanded torque $M_{eng\_req}$, and the respective alternative hypothesis by a possible reason why the actual torque $M_{eng\_act}$ does not correspond to the demanded torque $M_{eng\_req}$.

As mentioned above, the previously determined measured values $D_{ref}$ may be stored in a chart with sections a0-am, b0-bm, c0-cm, . . . n0-nm. The actual current measured values $D_{act}$ are compared with the measured values stored in the respective sections a0-am, b0-bm, c0-cm, . . . n0-nm, and the section which in some respect most resembles the previously determined measured values $D_{ref}$ is chosen. Thus a section which most corresponds to the actual measured conditions is chosen. As the system knows what previous conditions the previously determined measured values $D_{ref}$ were measured/recorded in, the present actual conditions may be determined by the comparison.

If for example the comparison shows that the current measured values $D_{act}$ most closely resemble the previously determined measured values $D_{ref}$ for any of sections a0, b0, c0, . . . , n0, it is likely that there is a fuel supply stoppage, since the previously determined measured values $D_{ref}$ for sections a0, b0, c0, . . . , n0 will have been measured during dragging of the vehicle, i.e. when no fuel was being injected into the engine.

If for example the comparison shows that the current measured values $D_{act}$ most closely resemble the previously determined measured values $D_{ref}$ for any of sections a1 . . . am, b1 . . . bm, c1 . . . cm, . . . , n1 . . . nm, it may be found likely that a fuel type corresponding to that particular section is being used to power the vehicle. This finding may be made if the previously determined measured values $D_{ref}$ for sections a1 . . . am, b1 . . . bm, c1 . . . cm, . . . , n1 . . . nm were measured for different fuel types.

Figure 4A:
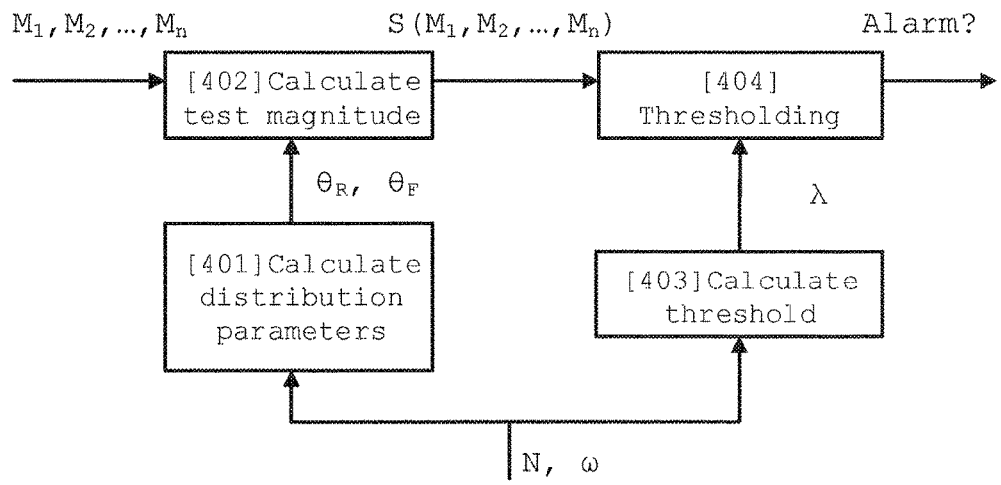
FIG. 4A depicts an example of a schematic flowchart for a detection method according to an embodiment of the present invention.
Figure 4B:
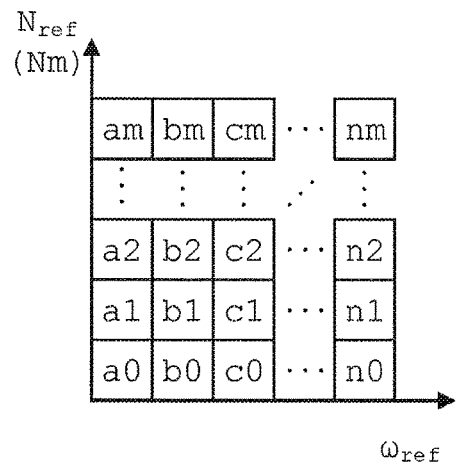
FIG. 4B depicts an example of a chart used by certain embodiments of the present invention.
Figure 5A:
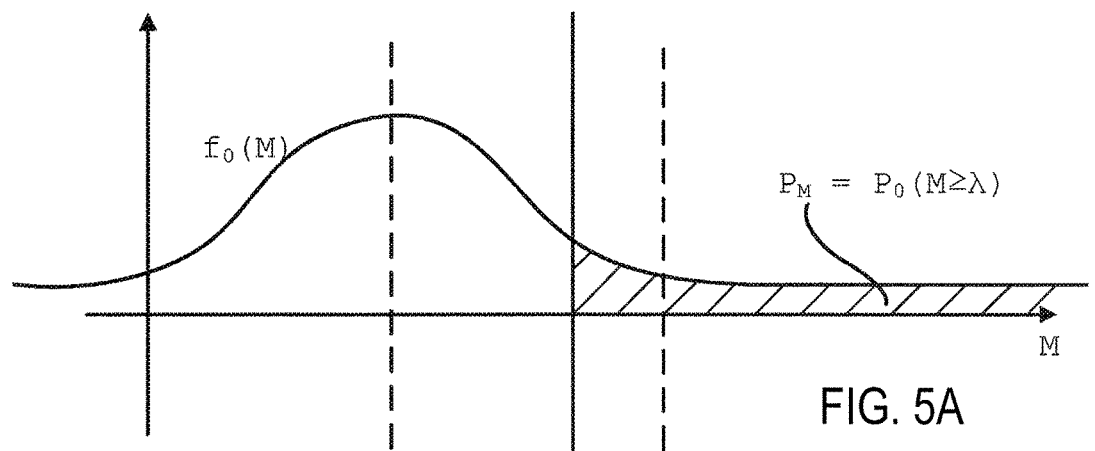
FIGS. 5A-B depict examples of density functions used by certain embodiments of the present invention.
Figure 5B:
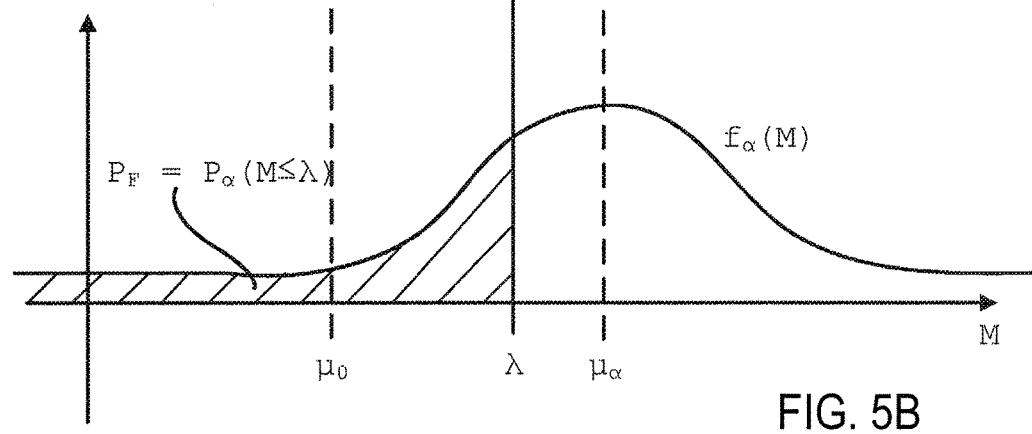

For each section a0-am, b0-bm, c0-cm, . . . n0-nm in the chart illustrated in FIG. 4B, the statistically correlated previously determined measured values $D_{ref}$ may be accompanied by one or more density functions pdf for the previously determined measured values $D_{ref}$, as illustrated schematically in FIGS. 5A and 5B. A result may reliably be arrived at by using statistically correlated measured values, e.g. in the form of density functions. Statistically correlated measured values may also be used to arrive at a measure of the probability of a correct detection.

The statistically correlated previously determined measured values $D_{ref}$ may in various embodiments of the present invention be used for example in detection of fuel supply stoppage or detection of fuel type change, as described below.

A probability of false alarm or a probability of missed detection is indicated, depending on the embodiment. FIG. 5A depicts a density function $f_0(M)$ for the previously determined measured values during dragging of the vehicle, as a function of the torque M. FIG. 5B depicts a density function $f_\alpha(M)$ for the previously determined measured values during a load for the vehicle, i.e. when fuel was being injected into the engine while the vehicle was in motion, as a function of the torque M.

A detection of fuel supply stoppage may for example be made by comparing an average value $\mu_{act}$ of the actual measured values $D_{act}$ with the respective average values $\mu_0$ and $\mu_\alpha$ of the density functions for dragging $f_0(M)$ and load $f_\alpha(M)$ of the previously determined measured values, as schematically illustrated in FIGS. 5A and 5B. If the average value $\mu_{act}$ of the actual measured values $D_{act}$ is closest for example to the average value $\mu_0$ corresponding to dragging, fuel supply stoppage may be detected, whereas it may be found that there is no fuel supply stoppage if the average value $\mu_{act}$ is closer to the average value for load $\mu_\alpha$.

In one embodiment, fuel supply stoppage may instead be detected if the average value $\mu_{act}$ of the actual measured values $D_{act}$ is closer to the average value $\mu_0$ corresponding to dragging than the limit value $\lambda$ is.

Using the signal statistics for the statistically correlated previously determined measured values $D_{ref}$ makes it possible in one embodiment of the present invention for the system on board the vehicle to calculate adaptively during operation a suitable threshold level $\lambda$ to be used in the detections so as to achieve a well-weighted probability $P_F$ of false alarm and $P_M$ of missed detection. This determination of the suitable threshold value becomes a compromise/weighting between the false-alarm probability $P_F$ and the missed-detection probability $P_M$, since a given threshold value level $\lambda$ in the test will define both probabilities.

Figure 5C:
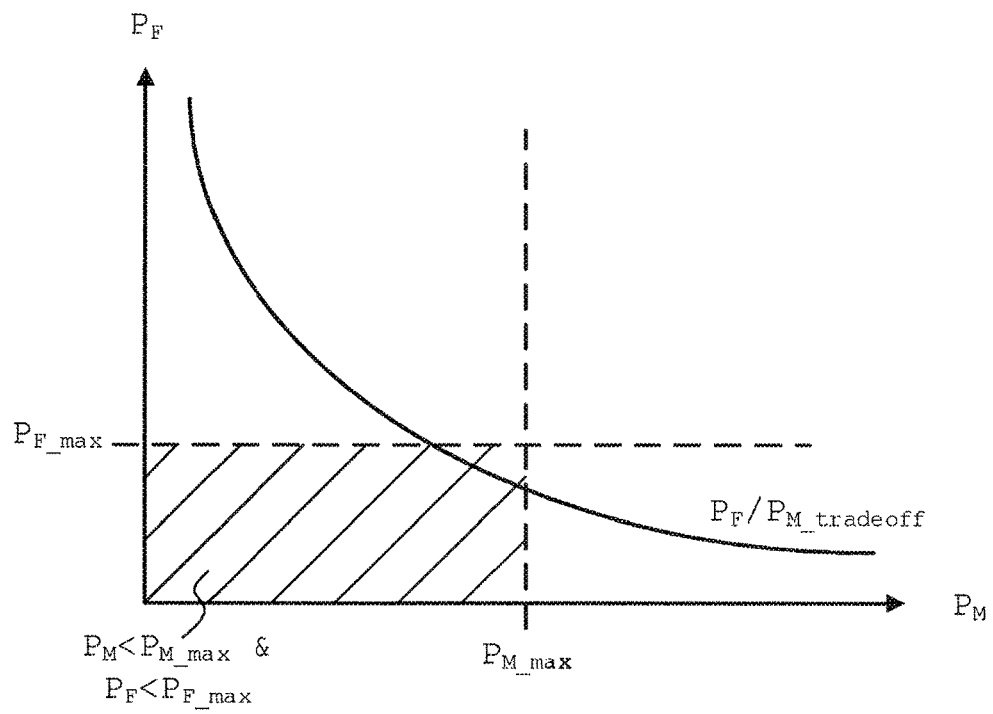
FIG. 5C depicts an example of a $P_F/P_M$ weighting curve.

FIG. 5C depicts a schematic non-limitative illustration of how a well-weighted false-alarm probability $P_F$ and missed-detection probability $P_M$ may be arrived at. The continuous curve $P_F/P_{M\_tradeoff}$ in the diagram illustrates a conceptual compromise/weighting curve for the probabilities of false alarm $P_F$ and missed detection $P_M$. The threshold value $\lambda$ depends on this compromise/weighting curve in such a way as to correspond to a point on the $P_F/P_{M\_tradeoff}$ curve. The relationship between the threshold value $\lambda$ and the $P_F/P_{M\_tradeoff}$ curve is described generally by equations 9 and 10 below. $P_{M-max}$ represents a maximum permissible probability of missed detection, $P_{F-max}$ a maximum permissible probability of false alarm. The hatched region of $P_M<P_{M-max}$ and $P_F<P_{F-max}$ thus indicates a region within which the probabilities of missed detection and false alarm are both within acceptable levels.

In one embodiment of the present invention the threshold value $\lambda$ is given a value such that the probabilities of missed detection and false alarm are both within the hatched region of $P_M<P_{M-max}$ and $P_F<P_{F-max}$. In other words a threshold value corresponding to the portion of the $P_F/P_{M\_tradeoff}$ curve which is within the hatched region of $P_M<P_{M-max}$ and $P_F<P_{F-max}$ is chosen.

In certain cases it will not be possible to achieve acceptable levels for both the probabilities of missed detection $P_M$ and false alarm $P_F$, i.e. it will not be possible for both of them to be within the hatched region of $P_M<P_{M-max}$ and $P_F<P_{F-max}$. In such cases, only one of these two criteria may be fulfilled, either $P_M<P_{M-max}$ or $P_F<P_{F-max}$. In one embodiment of the present invention, which of these criteria the system chooses to fulfil will depend on the driving situations and/or working points for which the present invention is to be employed. If the fault is deemed to be very serious, e.g. a safety-critical fault, the probability of missed detection, i.e. $P_M<P_{M-max}$, may be prioritized, which means that a certain proportion of false alarms may be accepted, but no detections may be missed. If instead the fault is deemed to be less serious, the probability of false alarm, i.e. $P_F<P_{F-max}$, may be prioritized, since the user/driver will for example have very low acceptance of erroneously lit warning lamps.

According to the embodiment, the threshold value level $\lambda$ is thus used to determine both the false-alarm probability $P_F$ and the missed-detection probability $P_M$. Thus data are gathered during normal operation of the vehicle in order to be able to determine the threshold value $\lambda$ on the basis of these data. The threshold value $\lambda$ thus determined then gives a detection method with known characteristics, i.e. with known probabilities of false alarm $P_F$ and missed detection $P_M$.

The simplest test/determination of the probabilities $P_F$, $P_M$ is to compare a present/actually estimated and/or measured torque M with the threshold value $\lambda$ and create an alarm if the threshold is undershot. To improve the performance and/or accuracy of the determination, the present/actually estimated and/or measured torque M may be subjected to filtering, e.g. low-pass filtering. Accuracy may also be improved by using two or more samples of the estimated and/or measured torque M.

In one embodiment of the present invention a hypothesis test may be used not only to detect whether the actual torque $M_{eng\_act}$ corresponds to demanded torque $M_{eng\_req}$ but also to isolate the reason, e.g. fuel stoppage or fuel type change. The detection may be made in two steps. The first step will detect whether demanded torque $M_{eng\_req}$ is achieved and the second will isolate the reason for the detection. If step 1 indicates that demanded torque $M_{eng\_req}$ has been achieved, step 2 need not be performed.

In both steps there are two hypotheses to be tested, the null hypothesis being the fault-free situation $H_0$, and the alternative hypothesis the fault situation $H_1$. In both steps the null hypothesis is that the actual torque $M_{eng\_act}$ is equal to the demanded torque $M_{eng\_req}$, whereas the alternative hypotheses differ between step 1 and step 2. In the first step the alternative hypothesis is that the torques are not equal. In the second case the alternative hypothesis is the reason which is to be tested, e.g. fuel stoppage.

In the respective hypothesis tests it is further assumed that the distributions of the signal for which the detection is being made are known for both the fault-free situation $H_0$ and the fault situation $H_1$. Various embodiments described above of the present invention measure and store previously determined measured values $D_{ref}$ of the signal during normal operation of the vehicle, both for the fault-free situation $H_0$ and the fault situation $H_1$. As described above, in the case of fuel supply stoppage detection, previously determined measured values $D_{ref}$ for the fault-free situation $H_0$ may for example be measured and stored when the vehicle is in motion and the engine is supplied with fuel. Similarly, previously determined measured values $D_{ref}$ for the fault situation $H_1$ corresponding to fuel supply stoppage may be measured and stored during dragging of the vehicle. Thus the fault situation $H_1$ may here be accompanied by density function $f_0(M)$ for dragging in FIG. 5A and the fault-free situation $H_0$ by density function $f_\alpha(M)$ for fuel supply in FIG. 5B.

A detection using a null hypothesis may be schematically illustrated by the flowchart in FIG. 4A. A first step 401 calculates the distribution parameter θ, e.g. on the basis of the load N and the engine speed ω as described for an embodiment below. The distribution parameter θ characterizes the distribution of the engine's torque M, i.e. $M \sim P_K(M/\theta)$. A demanded engine torque in a current operating situation is characterized by $\theta_K$ and $\theta_{,1}, \theta_{F,2}, \ldots, \theta_{F,N}$, which represent a set of parameters characterizing the engine's torque in a number of specified fault situations such as fuel stoppage, wrong fuel type, etc. $M_1, M_2, \ldots, M_n$ represent a number of samples, i.e. sample measurements, of the engine's actual torque. A second step 402 calculates the test magnitude $S(M_1, M_2, \ldots M_n)$ on the basis of fault situations $M_1, M_2, \ldots, M_n$ and the distribution parameter θ.

The method for detecting whether the actual torque $M_{eng\_act}$ corresponds to the demanded torque $M_{eng\_req}$ and for then isolating the possible reason for their corresponding or not corresponding is conducted with advantage in two steps, first detecting the torque deviation and then detecting/isolating the reason for the deviation. Step 2 need of course not be performed if the outcome of step 1 shows that there is no deviation.

Detection of whether the actual torque $M_{eng\_act}$ corresponds to the demanded torque $M_{eng\_req}$ may be done by hypothesis test in the form $$H^0 : \theta = \theta_R \quad \text{(equation 1)}$$

$$H^1 : \theta \neq \theta_R, \quad \text{(equation 2)}$$

in which $H^0$ is the so-called null hypothesis and $H^1$ the alternative hypothesis. The null hypothesis is represented by the actual torque $M_{eng\_act}$ being identical with the demanded torque $M_{eng\_req}$, and the alternative hypothesis by there being a difference between the actual torque $M_{eng\_act}$ and the demanded torque $M_{eng\_req}$.

The isolation of the reason for a difference between the actual torque $M_{eng\_act}$ and the demanded torque $M_{eng\_req}$ may be done by a set of N hypothesis tests in the form $$H^0 : \theta = \theta_R \quad \text{(equation 3)}$$

$$H^1 : \theta = \theta_{F,i}, \quad \text{(equation 4)}$$

in which the null hypothesis $H^0$ is represented by the actual torque $M_{eng\_act}$ being identical with the demanded torque $M_{eng\_req}$. The alternative hypothesis $H^1$ is represented by the fault situation having occurred. It should be noted that one hypothesis test per fault situation is here performed.

On the assumption that the torque distribution is normal, the aforesaid hypothesis test for detection may be done by using a so-called T test.

Hypothesis tests for the isolation may for example be performed for the aforesaid isolation hypotheses by using the Neyman-Pearson lemma $$S(M_1, M_2, \ldots, M_n) = \ln \frac{L(\theta_R \mid M_1, M_2, \ldots, M_n)}{L(\theta_{F,i} \mid M_1, M_2, \ldots, M_n)} = \ln \frac{P_T(M_1, M_2, \ldots, M_n \mid \theta_F)}{P_T(M_1, M_2, \ldots, M_n \mid \theta_{F,i})} \quad \text{(equation 5)}$$

If the null hypothesis $H^0$ is true, the test magnitude $S(M_1, M_2, \ldots, M_n)$ will assume a small value, so a fourth step 404 will reject the null hypothesis $H^0$ if $S(M_1, M_2, \ldots, M_n) > \lambda$, in which λ is a threshold value calculated in a third step 403, e.g. on the basis of the load N and the engine speed ω as described for an embodiment below.

On the assumption that samples $M_1, M_2, \ldots, M_n$ are independent and the distribution $P_N(\cdot \mid \theta)$ is Gaussian with average value μ and standard deviation σ, i.e. θ=(μ,σ), the value of the test magnitude $S(M_1, M_2, \ldots, M_n)$ is arrived at by the expression $$S(M_1, M_2, \ldots, M_n) = \sum_{i=1}^{n} \ln \frac{f(M_i \mid \mu_{F,i}, \sigma_{F,i})}{f(M_i \mid \mu_R, \sigma_R)}, \quad \text{(equation 6)}$$

in which $\mu_{F,i}$ and $\sigma_{F,i}$ are the respective average value and standard deviation for the torque in fault situation i, $\mu_R$ and $\sigma_R$ are the respective average value and standard deviation for the demanded torque $M_{eng\_req}$ and $f(\cdot \mid \cdot)$ is the Gaussian density function.

The threshold λ may in the third step 403 be determined either experimentally or theoretically for a given false-alarm probability. In a theoretical determination the test magnitude used $S(M_1, M_2, \ldots, M_n)$ is chi-2 distributed under the null hypothesis $H^0$.

In one embodiment the engine's current operating situation is parameterized by the load N and the engine speed ω, as indicated above, and the engine torque's distribution, and therefore the parameter θ, may also be parameterized, depending on the operating situation, by the load N and the engine speed ω. This also applies to the threshold λ, which will assume different values depending on the current operating situation, i.e. for different values of the load N and the engine speed ω. This is illustrated schematically in FIG. 4A.

The signal for the present/actually estimated and/or measured torque M may therefore be sampled, in which case a number of sample values $M_1, M_2, M_3, \ldots M_n$ are obtained. These one or more samples $M_1, M_2, M_3, \ldots M_n$ may then be used to form a test magnitude S.

In one embodiment these one or more samples $M_1, M_2, M_3, \ldots M_n$ may be low-pass filtered and then compared with the threshold value λ.

In one embodiment of the invention it is possible to use instead the so-called likelihood ratio between two functions $f_1$ and $f_0$ for the test magnitude S, e.g. $S(M_1)=f_\alpha(M_1)/f_0(M_1)$ for sample $M_1$. If the likelihood ratio $S(M_1)$ is less than a certain threshold value λ, i.e. if $S(M_1)<\lambda$, an alarm is created.

To improve performance, two or more samples may be used, in which case the log likelihood ratio is often used. If it may be assumed that samples $M_1, M_2, \ldots M_n$ are independent of one another, the expression for the log likelihood ratio becomes simply $$\log(S(M_1, M_2, \ldots M_n)) = \log(f_\alpha(M_1)) + \log(f_\alpha(M_2)) + \log(f_\alpha(M_3)) + \ldots \log(f_\alpha(M_n)) - \log(f_0(M_1)) - \log(f_0(M_2)) - \log(f_0(M_3)) - \ldots \log(f_0(M_n)).$$

A likelihood of a missed detection $P_M(\lambda)$ may be calculated for the test magnitude S with one sample as follows:

$$P_M(\lambda) = \int_{S(M)\geq\lambda} f_0(M)dM \qquad \text{(equation 7)}$$

A probability of a false alarm $P_F(\lambda)$ may be calculated for the test magnitude S with one sample as follows:

$$P_F(\lambda) = \int_{S(M)\geq\lambda} f_\alpha(M)dM. \qquad \text{(equation 8)}$$

In equations 7 and 8 above the notation means that the respective functions $f_0(M)$ and $f_\alpha(M)$ are integrated across the torque intervals for which the expression is true, i.e. the respective intervals where a detection is missed or a false alarm is given. In the case of missed detection it is specifically the density function $f_0(M)$ that is valid and the condition $S(M)\geq\lambda$ is fulfilled. In the case of false alarm it is the density function $f_\alpha(M)$ that is valid and the condition $S(M)\leq\lambda$ is fulfilled.

In for example FIGS. 5A and 5B, where the test magnitude is $S(M)=M$, equations 7 and 8 may respectively be written in the simplified forms of equation 9 (illustrated in FIG. 5a) and equation 10 (illustrated in FIG. 5b):

$$P_M(\lambda) = \int_{M\geq\lambda} f_0(M)dM \qquad \text{(equation 9)}$$

$$P_F(\lambda) = \int_{M\leq\lambda} f_\alpha(M)dM. \qquad \text{(equation 10)}$$

The threshold value λ may then be determined on the basis of one or more of equations 7-10 for given values of the probabilities of a missed detection $P_M(\lambda)$ and a false alarm $P_F(\lambda)$. In other words, the threshold value λ may be calculated through this relationship, which may for example be done by numerical calculation methods and/or by using precalculated and pretabulated values which the system according to the present invention will have access to. The threshold value λ may thereafter be used in the detection of fuel supply stoppage and of fuel type used, as described above for various embodiments of the present invention.

This may for example be done by determining a threshold value λ for each of the columns in the chart depicted in FIG. 4B, which means determining n threshold values $\lambda_a, \lambda_b, \lambda_c, \ldots, \lambda_n$. Control systems of the vehicle, e.g. the engine control system, will have knowledge of the engine speed &, which means that whichever of columns a, b, c, ..., n in the chart in FIG. 4B the engine's working point is in will be known both when data are gathered and when detection of fuel supply stoppage and/or fuel type takes place.

For a certain known engine speed ω, i.e. for a certain column in the chart in FIG. 4b, it is necessary, however, to determine which of the load intervals 0, 1, 2, ..., m the engine's working point is in. Previously gathered data and the determined threshold value $\lambda_a, \lambda_b, \lambda_c, \ldots, \lambda_n$ for the respective column a, b, c, ..., n may then be used in tests to determine whether the working point is within an assumed load interval 0, 1, 2, ..., m in the respective column or not. If the engine speed ω changes, another column a, b, c, ..., n and the threshold value $\lambda_a, \lambda_b, \lambda_c, \ldots, \lambda_n$ for the respective column will be used in the data gathering, the tests and the detection.

As described above, fuel supply stoppage may be detected if for an engine speed interval the engine should be within a certain load interval, e.g. at working point c2, but the test shows instead that the engine is at working point c0.

An erroneous assumption about fuel type used may be detected if for example for an engine speed interval c and an assumed second fuel type br2 the engine is assumed to be within load interval 2, i.e. at working point c2, but the test shows instead that the engine is at working point c1 or at working point cm, corresponding respectively to using other fuel types br1 and brm than the fuel type br2 which the system assumes is being used. As a non-limitative example it may be mentioned that in one embodiment a fuel type change may be detected if a 10% lower torque is determined than should have resulted from the fuel assumed, e.g. fossil diesel, making it possible to detect for example a change to biodiesel. Similarly it is possible in one embodiment for a fuel type change to be detected if a 10% higher torque is determined than should have resulted from the fuel assumed, e.g. biodiesel, making it possible to detect for example a change to fossil diesel. When that embodiment is employed, at least one of the load intervals may for example represent a torque difference of about 10%.

It may be noted that the division of the chart into these load intervals 0, 1, 2, ..., m, i.e. the difference in the amount of torque between the various intervals, affects the number of rows in the chart by which the assumed load and the actual load will differ.

It is generally easier to detect large differences in load, e.g. the difference between full load and fuel supply stoppage/dragging. This affects the probabilities of false alarm and missed detection. If for example relatively small differences in torque and/or load need to be detectable with a low probability of false alarm, this will result in a relatively low threshold value λ, leading in its turn to a relatively high probability of missed detection. Similarly, the threshold value λ will be relatively large for relatively large differences in torque/load and/or in detection with high probability of false alarm.

Figure 6:
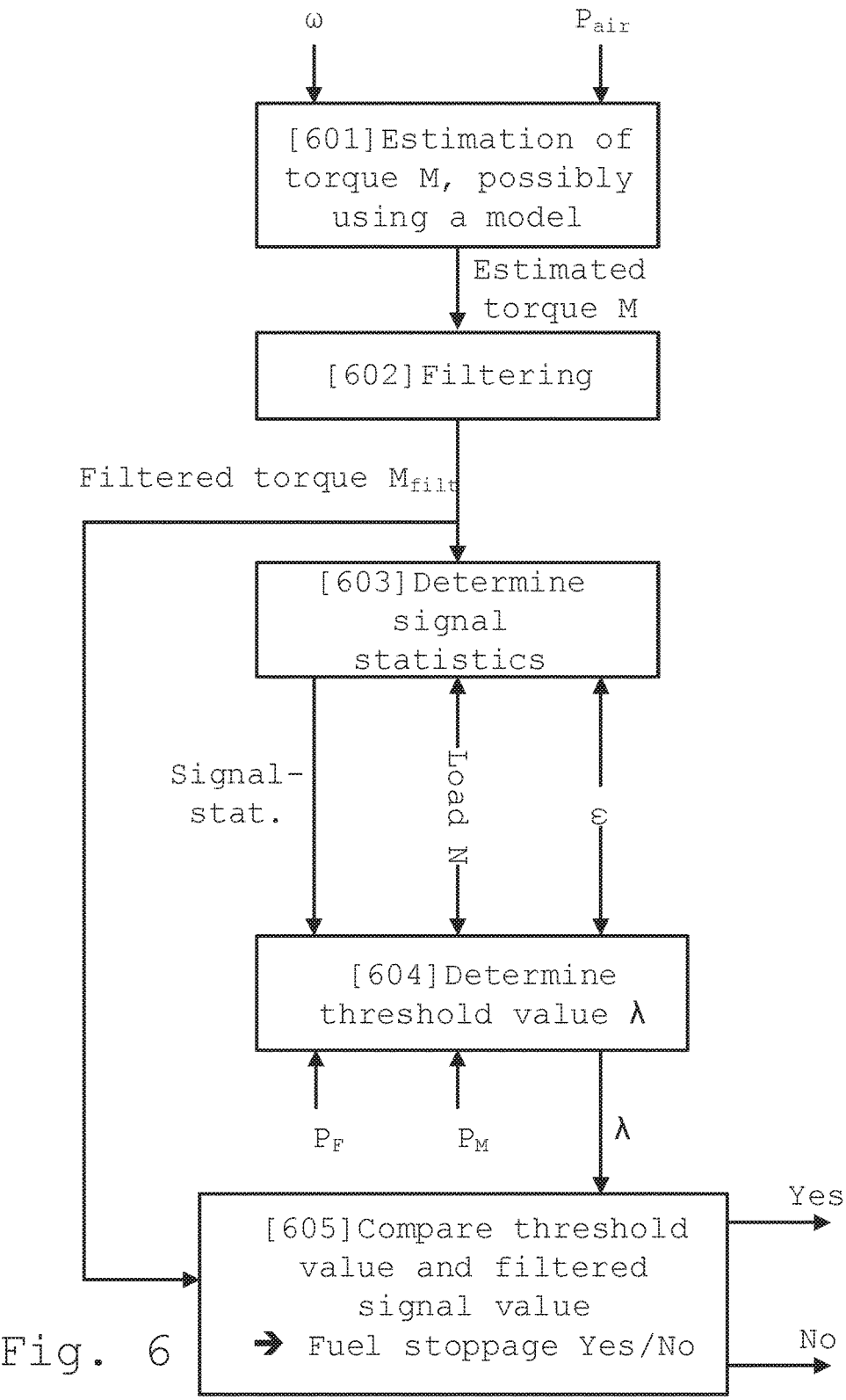
FIG. 6 depicts a flowchart according to an embodiment of the present invention.

FIG. 6 depicts a schematic flowchart for a method according to an embodiment of the present invention.

A first step 601 of the method determines a torque M during operation of the vehicle, e.g. by using a model of the engine and/or the vehicle for the estimation. The torque M may also be determined by torque measurements.

As a second step 602 of the method, the estimated torque M is filtered to arrive at a filtered estimated torque $M_{filt}$. This may for example be done by low-pass filtering, or by medianizing, of the torque signal.

The filtered estimated torque $M_{filt}$ is then used in conjunction with either or both of an engine load N and an engine speed ω, as a third step 603 of the method, to determine signal statistics related to the torque M in such a way as described above. Such signal statistics may in one embodiment be determined for each of sections a0-am, b0-bm, c0-cm, . . . n0-nm in the chart illustrated in FIG. 4B in such a way as described above, in which case the chart is compiled with the statistical values determined.

These signal statistics may then be used in conjunction with one or more from among the engine load N, the engine speed ω, the probability of false alarm $P_F$ and the probability of missed detection $P_M$ to determine, as a fourth step 604 of the method, a threshold value λ. The determination of the threshold value λ will be done as described above.

A fifth step 605 of the method determines whether there is a fuel supply stoppage or not. This determination is based here on a comparison of the filtered torque $M_{filt}$ provided by the method's second step 602 and the threshold value λ provided by the method's fourth step 604. In one embodiment, fuel supply stoppage may here be determined if the filtered torque $M_{filt}$ is greater than the threshold value λ. Similarly, it is thus then possible according to the embodiment to determine that there is no fuel supply stoppage here if the filtered torque $M_{filt}$ is below the threshold value λ.

It may be noted that the filtered torque $M_{filt}$ in FIG. 6 may correspond to the aforesaid torque $M_{eng\_act}$ actually delivered by the engine. The determination of signal statistics in the third step 603 and the determination of the threshold value in the fourth step 604 may take a period of time and may also be done over time, so the threshold value λ provided by the fifth step 605 of the method may be a representation of the aforesaid previously determined measured values $D_{ref}$. In other words, the fifth step 605 may comprise the aforesaid comparison at step 202 of actual measured values $D_{act}$ related to the behavior of the at least one parameter which is related to the actual torque $M_{eng\_act}$ with previously determined measured values $D_{ref}$ for correspondingly at least one respective parameter related to the actual torque $M_{eng\_act}$. The fifth step 605 may also comprise the detection at step 203, since it is determined whether there is a fuel supply stoppage or not. The fifth step 605 in FIG. 6 thus detects whether there is fuel stoppage or not.

In another embodiment the fifth step 605 may instead detect the fuel type being used in the vehicle, as described above.

One skilled in the art will appreciate that a method for detection of torque deviations of an engine according to the present invention may also be implemented in a computer program which, when executed in a computer, causes the computer to apply the method. The computer program is usually part of a computer program product 703 which comprises a suitable non-volatile digital storage medium on which the computer program is stored. Said computer-readable medium comprises a suitable memory, e.g. ROM (read-only memory), PROM (programmable read-only memory), EPROM (erasable PROM), flash memory, EEPROM (electrically erasable PROM), a hard disc unit, etc.

Figure 7:
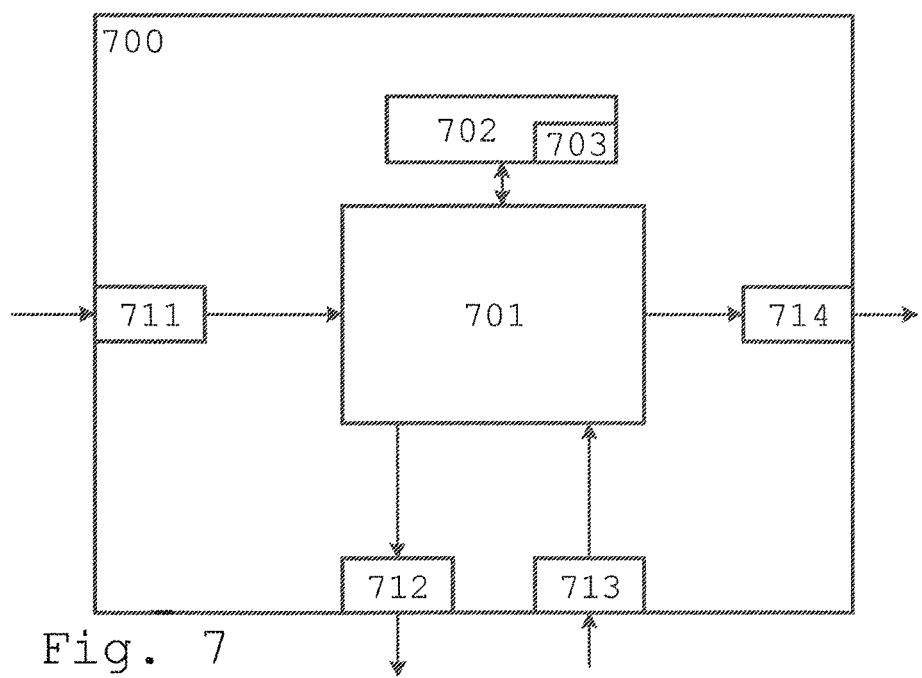
FIG. 7 depicts a control unit according to the present invention.

FIG. 7 depicts schematically a control unit 700 provided with a calculation unit 701 which may take the form of substantially any suitable type of processor or microcomputer, e.g. a circuit for digital signal processing (digital signal processor, DSP), or a circuit with a predetermined specific function (application specific integrated circuit, ASIC). The calculation unit 701 is connected to a memory unit 702 which is situated in the control unit 700 and which provides the calculation unit with, for example, the stored program code and/or stored data which the calculation unit needs to enable it to do calculations. The calculation unit is also adapted to storing partial or final results of calculations in the memory unit 702.

The control unit 700 is further provided with respective devices 711, 712, 713, 714 for receiving and sending input and output signals. These input and output signals may comprise waveforms, pulses or other attributes which the input signal receiving devices 711, 713 can detect as information and which can be converted to signals processable by the calculation unit 701. These signals are then conveyed to the calculation unit. The output signal sending devices 712, 714 are adapted to converting calculation results from the calculation unit to output signals for conveying to other parts of the vehicle's control system and/or the component or components for which the signals are intended.

Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection.

One skilled in the art will appreciate that the aforesaid computer may take the form of the calculation unit 701 and that the aforesaid memory may take the form of the memory unit 702.

Control systems in modern vehicles generally comprise a communication bus system consisting of one or more communication buses for connecting a number of electronic control units (ECUs), or controllers, to various components on board the vehicle. Such a control system may comprise a large number of control units, and taking care of a specific function may be shared between two or more of them. Vehicles of the type here concerned are therefore often provided with significantly more control units than depicted in FIGS. 1 and 7, as one skilled in the art will surely appreciate.

In the embodiment depicted, the present invention is implemented in the control unit 700 but might also be implemented wholly or partly in one or more other control units with which the vehicle is already provided or in any control unit dedicated to the present invention.

One aspect of the present invention proposes a system arranged for detection of torque deviations of an engine in a vehicle. As described above, the torque delivered by the vehicle's engine 101 at a point in time may deviate relative to a value for the torque which should then be delivered by the engine.

The system according to the present invention can deal with such unpredictable deviations of the torque provided.

The system comprises a measuring unit 141 adapted to making a measurement of actual measured values $D_{act}$ related to a behavior of at least one parameter which is related to an actual torque $M_{eng\_act}$ delivered by the engine 101. This actual torque $M_{eng\_act}$ is here delivered in consequence of a torque $M_{eng\_req}$ demanded from the engine.

The system comprises also a comparison unit 142 adapted to comparing the actual measured values $D_{act}$ which are related to the behavior of the at least one parameter with previously determined measured values $D_{ref}$ for correspondingly at least one respective parameter related to the actual torque $M_{eng\_act}$. The previously determined measured values $D_{ref}$ will have here been determined during normal operation of the vehicle 100.

The system comprises also a detection unit 143 adapted to detecting whether the actual measured torque $M_{eng\_act}$ deviates from the demanded torque $M_{eng\_req}$. The detection is based here on the comparison described above done by the comparison unit 142.

In one embodiment of the present invention the system comprises also a utilization unit 144 adapted to using the detection made by the detection unit 144 in controlling at least one system of the vehicle 101, e.g. a system arranged for automatic gearchanging by the gearbox 103, or a system arranged for cruise control of the vehicle's speed.

The system according to the present invention has advantages similar to those described above for the method according to the present invention.

The system according to the present invention may be adapted to effecting all the method embodiments described above, such that the system will achieve for the respective embodiments their advantages described above.

One skilled in the art will also appreciate that the above system may be modified according to the various embodiments of the method according to the invention. The invention relates also to a motor vehicle 100, e.g. a truck or a bus, provided with at least one system for determination of torque deviations of an engine.

The present invention is not confined to its embodiments described above but relates to and comprises all embodiments within the protective scope of the attached independent claims.

The invention claimed is:

1. A method for detection of torque deviations of an engine in a vehicle, the method comprising:
    measuring actual measured values related to a behavior of at least one parameter related to an actual torque delivered by said engine in consequence of a torque demanded from said engine;
    comparing said actual measured values related to said behavior of said at least one parameter with previously determined measured values of correspondingly at least one respective parameter related to said actual torque, said previously determined measured values having been determined during normal operation of said vehicle;
    detecting whether said actual torque deviates from said demanded torque, said detection being based on said comparison; and
    controlling the vehicle based on the detection.

2. A method according to claim 1, wherein said previously determined measured values which correspond to said at least one respective parameter related to said actual torque, will have been determined when said vehicle was substantially new, and will have thereafter been maintained.

3. A method according to claim 1, wherein said previously determined measured values which correspond to said at least one respective parameter related to said actual torque, will have been determined by at least partly continuous updating of said previously determined measured values during said vehicle's use.

4. A method according to claim 1, wherein said normal operation comprises either or both of:
    a movement of said vehicle when fuel is being injected into said engine, and
    a dragging of said vehicle.

5. A method according to claim 1, wherein said at least one parameter which is related to an actual torque comprises a speed of said engine.

6. A method according to claim 5, wherein
    said previously determined measured values will have been determined at loads and speeds of said engine during a normal operation of said vehicle;
    said measurement of said behavior of said at least one parameter comprises measuring an actual amplitude variation of an actual speed of said engine; and
    said comparison comprises a comparison of said actual amplitude variation and said previously determined measured values of said engine speed.

7. A method according to claim 6, further comprising:
    detecting a stoppage in a fuel supply to said engine based on said comparison of said actual amplitude variation and said previously determined measured values of said engine speed,
    wherein said detection uses a relationship that said actual amplitude variation increases with increasing actual load if there is fuel supply to said engine.

8. A method according to claim 6, further comprising:
    detecting an actual fuel type used which has an actual energy content which deviates from an expected energy content of an expected fuel type used,
    wherein said detection is based on said comparison of said actual amplitude variation and said previously determined measured values of said engine speed and uses a relationship that said actual amplitude variation is proportional to said actual energy content.

9. A method according to claim 6, wherein said actual amplitude variation is proportional to a torque generated by said engine.

10. A method according to claim 1, wherein said at least one parameter related to an actual torque comprises supplying a charge pressure of air to said engine.

11. A method according to claim 10, wherein
    said previously determined measured values are determined at loads and charge pressures of air which is supplied to said engine during normal operation of said vehicle;
    said measurement of said behavior of said at least one parameter comprises measurement of an actual charge pressure of said engine; and
    said comparison comprises a comparison of said actual charge pressure and said previously determined measured values of said charge pressure.

12. A method according to claim 11, wherein said detection of whether said actual torque deviates from said demanded torque uses a relationship that said actual charge pressure increases with increasing actual load.

13. A method according to claim 1, wherein said at least one parameter which is related to an actual torque comprises a temperature of said engine.

14. A method according to claim 13, wherein
    said previously determined measured values are determined at loads and temperatures of said engine during normal operation of said vehicle;
    said measurement of said behavior of said at least one parameter comprises measurement of an actual temperature of said engine; and
    said comparison comprises a comparison of said actual temperature and said previously determined measured values of said temperature.

15. A method according to claim 14, wherein said detection of whether said actual torque deviates from said demanded torque uses a relationship that should increase with said actual load.

16. A method according to claim 1, further comprising a plurality of said previously determined measured values are statistically correlated.

17. A method according to claim 16, wherein the statistical correlation comprises at least one of:
an average value of measured values of said at least one respective parameter related to said actual torque;
a standard deviation of measured values of said at least one respective parameter related to said actual torque.

18. A method according to claim 17, wherein said comparison comprises use of a null hypothesis analysis.

19. A method according to claim 1, wherein said previously determined measured values are divided into intervals of a load for said engine.

20. A computer program product comprising a non-volatile computer-readable medium and a computer program comprised of program codes contained in said computer-readable medium such that when said program codes are executed in a computer, that causes said computer to apply the method according to claim 1.

21. A system configured for detection of torque deviations of an engine in a vehicle, the system comprising:

a measuring unit configured for measurement of actual measured values related to a behavior of at least one parameter related to an actual torque delivered by said engine in consequence of a torque demanded from said engine;
a comparison unit configured for comparison of said actual measured values related to said behavior of said at least one parameter with previously determined measured values of correspondingly at least one respective parameter related to said actual torque, said previously determined measured values having been determined during normal operation of said vehicle;
a detection unit configured for detection of whether said actual torque deviates from said demanded torque, wherein said detection is based on said comparison; and
a utilization unit configured to control at least one system in said vehicle based on the detection.

22. A vehicle comprising a system according to claim 21.

* * * * *